(12) United States Patent
Rohde et al.

(10) Patent No.: US 12,327,218 B2
(45) Date of Patent: Jun. 10, 2025

(54) KEYED EVENT QUEUE

(71) Applicant: City Storage Systems LLC, Los Angeles, CA (US)

(72) Inventors: Henning Korsholm Rohde, Seattle, WA (US); Aravind Velamur Srinivasan, Sammamish, WA (US); Yasser Elsayed, Bothell, WA (US); Paul Rondeau, Vancouver (CA); Kristopher Raney, Oak Park, CA (US)

(73) Assignee: City Storage Systems LLC, Los Angeles, CA (US)

( * ) Notice: Subject to any disclaimer, the term of this patent is extended or adjusted under 35 U.S.C. 154(b) by 263 days.

(21) Appl. No.: 17/485,981

(22) Filed: Sep. 27, 2021

(65) Prior Publication Data

US 2023/0096403 A1 Mar. 30, 2023

(51) Int. Cl.
*G06Q 10/087* (2023.01)
*G06Q 10/0631* (2023.01)

(52) U.S. Cl.
CPC ... *G06Q 10/087* (2013.01); *G06Q 10/063114* (2013.01)

(58) Field of Classification Search
CPC .......... G06G 10/087; G06G 10/063114; G06F 9/542
See application file for complete search history.

(56) References Cited

U.S. PATENT DOCUMENTS

| | | | |
|---|---|---|---|
| 10,200,295 B1* | 2/2019 | Word | H04L 47/50 |
| 10,210,106 B2* | 2/2019 | Aden | G06F 13/1642 |
| 10,308,689 B2* | 6/2019 | Shresta | C07K 14/005 |
| 11,218,419 B1* | 1/2022 | Sharifi Mehr | H04L 47/70 |
| 11,627,099 B2* | 4/2023 | Madhavan | H04L 49/9036 709/206 |
| 11,699,201 B2* | 7/2023 | Hunn | H04L 9/0891 705/50 |
| 11,887,055 B2* | 1/2024 | Hunn | G06F 16/219 |
| 2006/0149787 A1* | 7/2006 | Surlaker | G06F 9/546 |
| 2010/0281491 A1* | 11/2010 | Surlaker | G06F 9/546 719/314 |
| 2017/0250857 A1 | 8/2017 | McCullough et al. | |
| 2017/0317935 A1* | 11/2017 | Murthy | G06F 15/17 |
| 2019/0147086 A1* | 5/2019 | Pal | G06F 16/2425 707/718 |
| 2020/0211087 A1* | 7/2020 | Pierce | G06Q 30/08 |
| 2024/0070783 A1* | 2/2024 | Lutnick | G06Q 40/04 |

OTHER PUBLICATIONS

International Search Report and Written Opinion issued in Appln. No. PCT/US2022/043197 dated Jan. 3, 2023 (15 pages).

\* cited by examiner

*Primary Examiner* — Dylan C White

(74) *Attorney, Agent, or Firm* — Lerner David LLP

(57) ABSTRACT

Keyed Event Queue (KEQ) is a multi-region, dynamically-scaled message broker for managing a large number of independent strictly-ordered message queues. In this regard, a first request having a first plurality of associated events may be enqueued in a first queue, while a second request having a second plurality of associate events is enqueued in the second queue. The first and second queues are processed independently, such that any issues or failures that may arise with respect to the first plurality of events do not block the second plurality of events from being executed.

18 Claims, 8 Drawing Sheets

KEYED EVENT QUEUE

BACKGROUND

Customers commonly place orders for services, such as food delivery, product delivery, ridesharing services, etc., where such orders are fulfilled through an order platform ecosystem. Each order typically consists of a number of events. For example, ordering food for delivery can include events such as: customer places an order; kitchen confirms; driver arrives; order ready for pickup; etc. Multiple orders therefore produce a large total number of events. Different components, or microservices, may react to different events and create new ones. For example, a first order processing system may confirm the order, while a second order processing system prints the order.

Conventional order platform ecosystems include producers and consumers that communicate via a message broker, such as Kafka. The producers append messages to queues and the consumers read and acknowledge messages from the queues. Event distribution is delegated to the message broker to decouple event producers and consumers. Order events from different orders are spread out over hours and interleaved into a single queue, processed sequentially. This can result in a Head-of-Line blocking problem, in which consumers must process events sequentially per partition. If an event fails, it prevents subsequent events in the same order and also prevents sequentially ordered events from other orders that follow the failed event in sequence. To prevent blocking, the failed event is often dropped if it still fails after retry.

Conventional order platform ecosystems also have a fixed scale. As such, while consumers may come and go, the number of partitions cannot be changed to accommodate additional or fewer consumers without breaking ordering for existing consumers or live production data.

BRIEF SUMMARY

The present disclosure describes an improved message broker, called a keyed event queue (KEQ). KEQ overcomes the Head-of-Line blocking problems of existing brokers, while also being a baseline highly-available, reliable, and scalable service. KEQ provides for horizontal scalability to accommodate future growth, low-latency message delivery, and transactional enqueuing. In particular, KEQ guarantees message processing exclusivity with explicit leases. For example, if a consumer instance holds a valid lease for a message, KEQ guarantees that no other instance holds a valid lease for that message even in the presence of failures.

One aspect of the disclosure provides a method of managing requests and coordinating fulfillment of the requests, comprising receiving, at one or more processors, a first request, the first request having a first plurality of events to take place to fulfill the first request, enqueuing, by the one or more processors, the first plurality of events in a first queue of a plurality of independent queues, receiving, at the one or more processors, a second request, the second request having a second plurality of events to take place to fulfill the second request, enqueueing, by the one or more processors, the second plurality of events in a second queue of the plurality of independent queues, the second queue separate from the first queue, processing, by the one or more processors, the first plurality of events in sequence, and processing, by the one or more processors, the second plurality of events in sequence, wherein the processing of the second plurality of events is independent of a status of processing of the first plurality of events.

Processing the first plurality of events and processing the second plurality of events may include communicating event information to one or more consumers, determining a status of completion of events by the one or more consumers, and updating the first queue and the second queue based on the determined status of completion. Communicating event information to the one or more consumers may include at least one of bidirectional streaming or sending remote procedure calls to the one or more consumers. The consumers may be, for example, remote processing devices at external entities.

In some implementations, enqueueing the first plurality of events comprises writing the first plurality of events to the first queue in a distributed database. Writing the first plurality of events to the first queue in the distributed database may include creating an identifier for the first queue in a first shard. The first shard may be exclusively accessed by a first worker of the one or more processors. Enqueuing the first plurality of events may further include providing a signal to a distributed key value store in communication with the distributed database, the signal indicating the identifier for the first queue. The one or more processors may scan for updates to the distributed database.

According to some implementations, the method further comprises electing, by the one or more processors, a leader for allocating the processing of the first plurality of events and the processing of the second plurality of events to selected processing units of the one or more processors.

Another aspect of the disclosure provides a system for managing requests and coordinating fulfillment of the requests. The system includes one or more memories and one or more processors in communication with the one or more memories. The one or more processors may be configured to receive a first request, the first request having a first plurality of events to take place to fulfill the first request, enqueue the first plurality of events in a first queue of a plurality of independent queues, receive a second request, the second request having a second plurality of events to take place to fulfill the second request, enqueue the second plurality of events in a second queue of the plurality of independent queues, the second queue separate from the first queue, process the first plurality of events in sequence, and process the second plurality of events in sequence, independent of a status of processing of the first plurality of events.

The system may further include an interface for communication with one or more consumers, wherein in processing the first plurality of events and processing the second plurality of events, the one or more processors are further configured to communicate event information through the interface to the one or more consumers, determine a status of completion of events by the one or more consumers, and update the first queue and the second queue based on the determined status of completion. In communicating event information to the one or more consumers the one or more processors are configured for bidirectional streaming with the one or more consumers. The one or more consumers may be, for example, remote processing devices at external entities.

The one or more processors may comprise a write module, wherein in enqueueing the first plurality of events the writer module is configured to write the first plurality of events to the first queue in a distributed database. Writing the first plurality of events to the first queue in the distributed database may include creating an identifier for the first queue in a first shard. The one or more processors may comprise one or more worker nodes, wherein in enqueuing the first plurality of events the worker nodes are configured to provide a signal to a distributed key value store in communication with the distributed database, the signal indicating the identifier for the first queue. The one or more processors may be further configured to periodically scan for updates to the distributed database.

According to some examples, the one or more processors are further configured to elect a leader for allocating the processing of the first plurality of events and the processing of the second plurality of events to selected processing units of the one or more processors.

Another aspect of the disclosure provides a non-transitory computer-readable medium storing instructions executable by one or more processors for performing a method of managing requests and coordinating fulfillment of the request. The instructions provide for receiving a first request, the first request having a first plurality of events to take place to fulfill the first request, enqueuing the first plurality of events in a first queue of a plurality of independent queues, receiving a second request, the second request having a second plurality of events to take place to fulfill the second request, enqueuing the second plurality of events in a second queue of the plurality of independent queues, the second queue separate from the first queue, processing the first plurality of events in sequence, and processing the second plurality of events in sequence, independent of a status of processing of the first plurality of events.

DETAILED DESCRIPTION

Overview

KEQ is a message broker, wherein a "topic" is a namespace categorization or subject for messages, a "subscription" is a recipient, such as a service, of all messages in a topic, and a "consumer" is an instance of a subscription recipient, each consumer receiving some messages. Once accepted by the broker, messages are delivered at least once and generally in order to some consumer of each subscription. Instead of using N permanent partitions, KEQ uses a separate, temporary event queue for every key.

Figure 1:
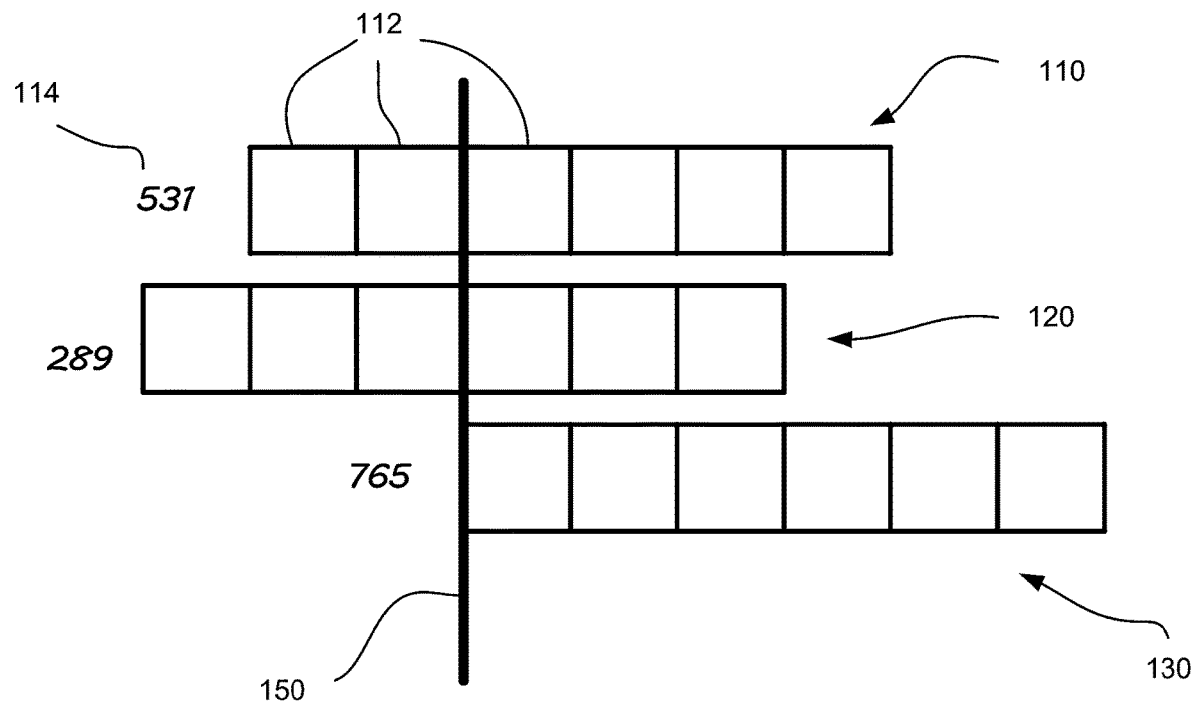
FIG. 1 is a logical representation of a plurality of independently processed queues according to aspects of the disclosure.

FIG. 1 illustrates an example of independent event queues 110, 120, 130, wherein each order includes a plurality of events 112. The events 112 corresponding to a first order are placed in a first queue, while the events corresponding to a second order are placed in a second separate queue, etc. The events 112 within each queue 110-130 are processed by a server 150. The events 112 of each order are in sequence, but orders can progress independently within and across subscriptions.

A queue is identified by a (topic, region, key) tuple, where a key 114 may be a universally unique identifier (UUID). Each message exists under a queue and is ordered by a sequence number (seqno). Any message is uniquely identified by a cursor, which may be a (region, topic, key, seqno) tuple. Using the cursor to identify the message can be used to distinguish a message reference from the message itself.

Figure 2:
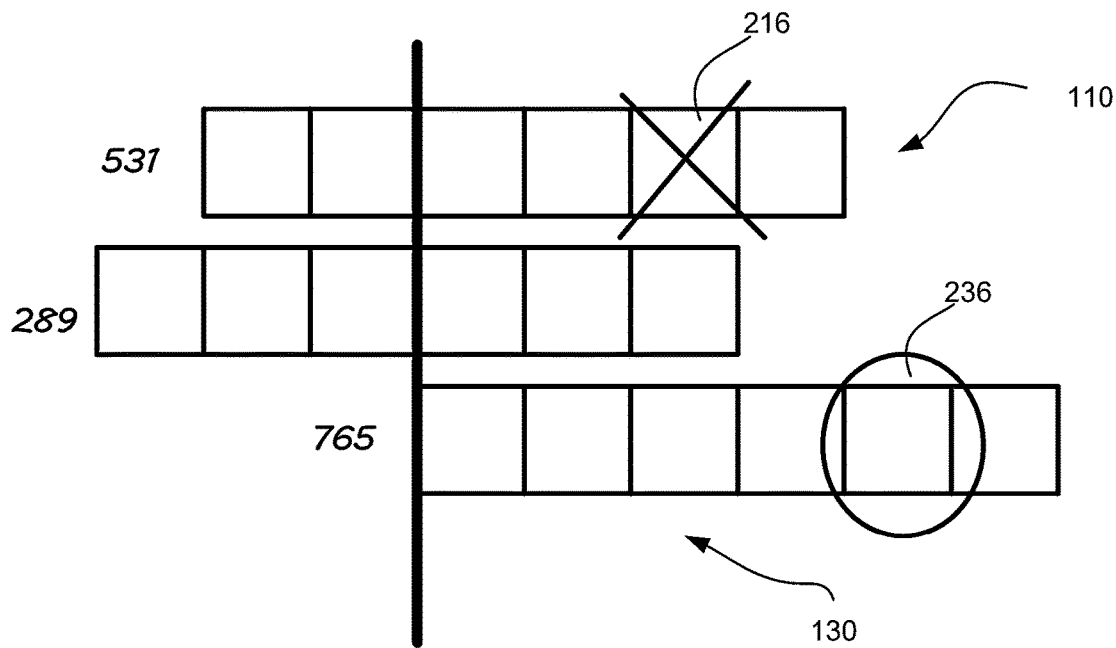
FIG. 2 is another logical representation of a plurality of independently processed queues according to aspects of the disclosure.

As shown in FIG. 2, an event 216 in the queue 110 may fail. Because each order is kept in a separate queue, queues 120 and 130 can continue to be processed and therefore the orders corresponding to the queues 120 and 130 are unaffected by the failure of event 216. Moreover, some actions associated with events may be identified as urgent, such as urgent event 236. According to some examples, processing of the queue 130 may be expedited as compared to the other queues 110, 120 so as to more quickly process urgent event 236.

KEQ may be implemented as a multi-region messaging service using a distributed database management system for durable messages and bookkeeping, and a distributed, reliable key-value store for leader election and internal notification broadcast. A shard is a range of queues and is the unit of bookkeeping for both topics and subscriptions. Topics may be split into any number of shards per region, and the number of shards per region could be changed dynamically. KEQ nodes collectively hold all bookkeeping in memory. It may also be durably stored in the distributed database. Messages and bookkeeping may be index-free and explicitly regionalized with a preferred leaseholder region to avoid cross-region database updates/queries, allowing KEQ to favor region-local consumers for region-affinity.

In addition to topic/subscription management, KEQ messages and bookkeeping may be stored in tables in the distributed database. For example, message may be stored in a table with (region, topic, key, seqno) as an index and a corresponding payload. Queues may be stored in a table with (region, topic, key) as the index and a corresponding seqno. The queues table may serve as an index of messages that can be practically scanned. Cursors may be stored in a table with (region, subscription, key) as the index and a corresponding processed seqno.

Example Systems

Figure 3:
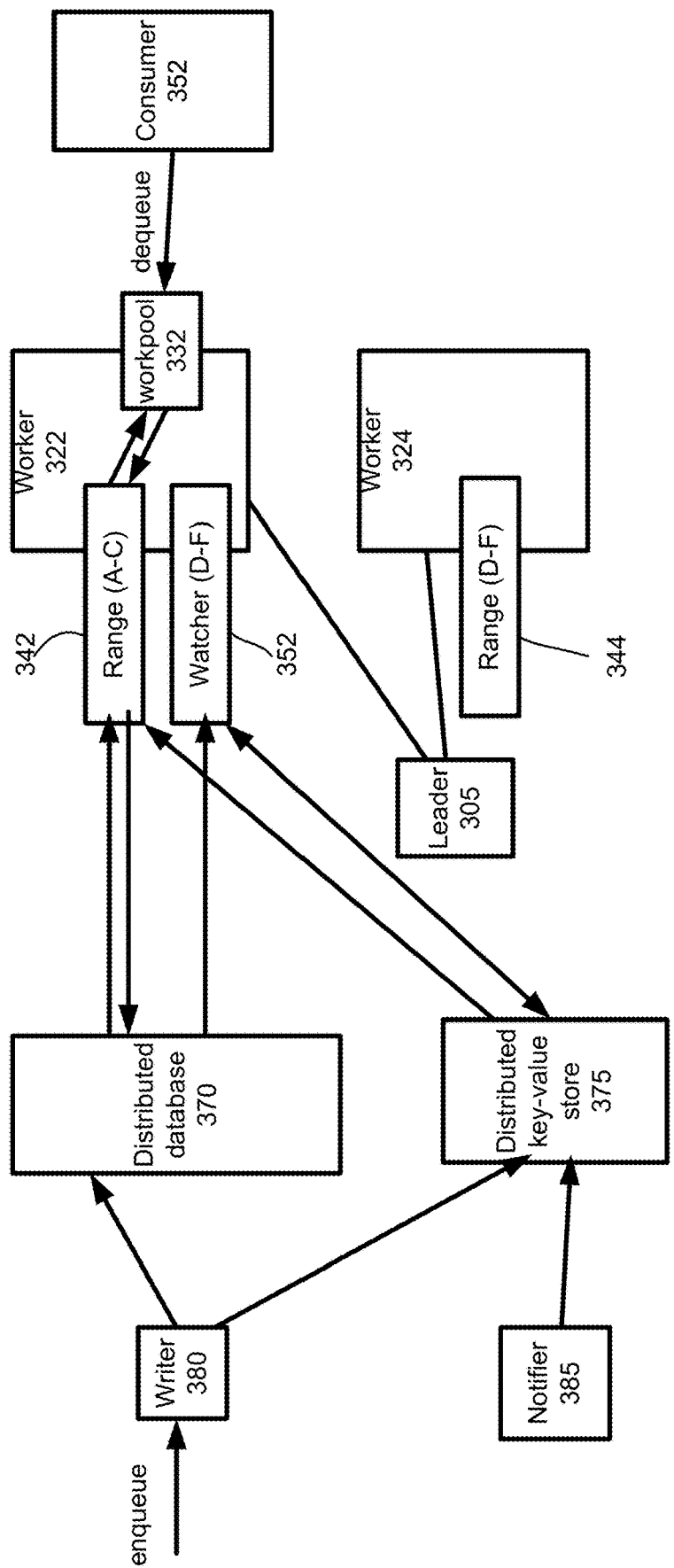
FIG. 3 is a block diagram illustrating an example architecture of KEQ according to aspects of the disclosure.

FIG. 3 illustrates an example system for implementing KEQ. The system includes a leader 305 and a plurality of workers 322, 324, which communicate with consumers Leader 305 may be a dynamically-chosen global leader of workers 322, 324. The leader 305 may be, for example, a server that is elected from a number of servers, wherein the non-leader servers are the workers 322, 324. In some examples, the leader 305 may be a software module that is active on a single machine in a cluster at any given time. In some examples, the workers 322, 324 may also be software modules, wherein one or more of the workers 322, 324 may be active on the machine or node that holds the leader or on a separate machine.

The leader 305 may be responsible for shard assignments and load distribution among all workers 322, 324, and pushing any global topic/subscription information. For example, the leader 305 and workers 322, 324 may form a "control plane" that coordinates how work should be sharded or distributed. By way of example only, the leader 305 may assign shards for order IDs 0-5000 to the worker 322, and shards for order IDs 5001-10000 to worker 324. The leader 305 may use distributed database 370 for high level topic and/or subscription information. Topics/subscriptions use an ID internally, which allows for renaming and for compactness. The leader 305 owns the global state and any topic/subscription change can be made through the leader 305. Communication between workers 322, 324 and the current leader may be managed via a proxy (not shown), which handles re-connects, election and hides whether the leader 305 is remote or local.

Workers 322, 324 coordinate with the leader to renew their ownership lease. If the leader 305 crashes, a new leader takes over and collects existing assignments from workers 322, 324. If a worker or consumer crashes, the leader will re-assign the shards after its lease expires.

In some instances, assignments may be reassigned. For example, re-assignment may be performed for load balancing, or if a worker 322, 324 signals that it intends to disconnect, such as due to process termination. When re-assignment is performed, the leader 305 asks the worker from which the assignment is being moved to drain the shard and relinquish it when done to speed up re-assignments.

Each worker 322, 324 coordinates data-plane aspects and is responsible for managing consumer connections and managing the lifecycle of leader-assigned shards for both topics and subscriptions. The worker 322, 324 deliberately makes no decisions and defers to the leader 305, but failures such as disconnects may cause it to react. While two workers 322, 324 are shown in FIG. 3, any number of workers may be included in the system. Moreover, the number of workers may be scaled upwards or downwards.

The workers 322, 324 may be connected to consumers 352. A consumer 352 may be an entity or service that performs actions corresponding to each event. For example, where the events correspond to a food delivery order, the consumer 352 may be a restaurant that receives the order and prepares the food, or a driver service that picks up the food from the restaurant and delivers it. According to some examples, each event may be a smaller step in an overall process of receiving a food order and delivering it. For example, each event may be any time something happened to the order such as "order placed", "ready to print", "ticket printed", "ready to cook", "cooked", "ready to pickup", etc. A producer takes or reports some action and updates the order information and appends/emits the corresponding event to the order event queue. A consumer again reads and acknowledges, or reacts to, events. Consumers for order processing may also be producers. For example, the printing service will react to the "ready to print" event by printing a physical ticket in some kitchen where the order is supposed to be cooked. After the ticket is printed, the printing service will emit "ticket printed" event (which other services may react to). When the cook has made (some part of) the physical order, they will press a button to update the order to a "cooked" state and emit the "cooked" event.

Each consumer connection for dequeuing messages is managed by a workpool 332, which may be a set of work objects. The workpool 332 may match the lifetime of the long-lived bi-directional streaming connection, sequence messaging delivery, sub-lease messages, and manage heartbeats to the consumer. Each message is individually acknowledged and sub-leased. When a consumer 352 connects, the workpool 332 is created and the leader 305 is informed about its existence. Shard allocation may confirm to wherever consumers 352 are connected. The leader 305 may ask the worker 322 to disconnect the consumer 352 for load-balancing.

When a shard is assigned to a specific consumer under a worker-level lease, the worker creates a range 342, 344, which may be exclusively responsible for delivering messages in that shard and recording progress. The range 342, 344 may be, for example, a software component responsible for delivering messages in a shard to a specific connected consumer. When a shard is assigned to a worker for a subscription, where the consumer is a connected, a range may be created to listen for notifications and deliver messages. The range 342, 344 maintains cursors what is the tail of the queue, or latest in memory, and what has been successfully processed. The messages and cursors form a range of rows in the database. Messages that are eligible to be delivered are called "activated". The range 342, 344 will activate the next message, or a batch of messages, for a queue once it has durably recorded that the previous one has been processed.

Maintaining cursors for the tail of the queue may involve listening to notifications from distributed key value store 375 on what changed for that topic shard from that point, and an initial strong scan of a current state of the topic shard. Ranges 342, 344 try to deliver new messages as quickly as possible, but also handle slow consumers and subscriptions that are way behind. Internally, ranges 342, 344 use concurrent blocking queues to apply back pressure. According to some examples, the range 342, 344 may pause processing notifications if fully backed up.

A watcher 352 may be assigned for each topic. The watcher 352 may be a software component associated with a topic shard. It may be dynamically assigned by the leader 305, but is independent of any connected consumers and can be assigned to any worker 322, 324. The watcher 352 performs the following for each shard: remedy if messages were enqueued, but corresponding notifications were not sent; expire and delete queues that have exceeded a retention period; and clean up its own and range tracking of cursors for the deleted queues. Ranges 342, 344 may be notified that a queue has been deleted, for example, by sending a notification with −1 as the seqno. Watchers 352 durably store cursors to track that notifications have been sent.

The watcher 352 periodically scans a shard of distributed database 370. According to some example, the watcher 352 when scanning may use eventual consistent reads to avoid conflicting with updates. Based on the scan, the watch 352 may determine ground truth on what queues are added, updated, or removed.

The watcher 352 may also observe notifications from the distributed key value store 375 to avoid redundant notifications, such as if another component has already emitted the notification.

The distributed key value store 375 supports watching a single key range as a changelog instead of all notifications. Each range 342, 344 sees relevant changes only. Notifications may be emitted by "flashing" updates, such as by writing a cursor and then deleting it immediately. According to other examples, an in-memory multi-region Semi-Reliable Broadcast (SRB) service may be implemented for handling broadcast of notifications.

Writer 380 may be responsible for enqueuing incoming messages. For example, the writer 380 commits the message with the next seqno and, if successful, asynchronously broadcasts a notification via the distributed key value store 375. Concurrent writes may be serialized as a result of using distributed database transactions. The message is accepted if the commit succeeds. If the notification is not emitted for any reason, the watcher 352 may eventually discover it for delivery.

Notifier 385 allows for external writers to emit distributed key value store notifications. It may be used by remote topics after a transactional enqueue. Remote topics may differ from internal topics in how the messages/queues are written and deleted. For example, internal topics go through the writer 380. In contrast, remote topics may write directly to the distributed database 370 and then call the notifier 385 to let KEQ quickly deliver the message. KEQ may have read-only access to remote tables. Deletion of messages/queues for remote topics may be performed by the external writer instead of the watcher 352. While the writer 380 and notifier 385 are shown as separate components, they may be modules within a same computing device.

In operation, the leader 305 is elected and announces itself. All workers 322, 324 connect to the leader 305. The leader 305 reads topics/subscriptions and assigns work to all workers 322, 324. The leader 305 tries to assign work evenly, while respecting region affinity if possible. The leader 305 can only assign range shards to workers where a corresponding consumer is actually connected. Watchers 352 can be freely assigned. When a consumer 352 of some subscription connects to a worker 322, the worker 322 informs the leader 305. The leader 305 may choose to assign the worker 322 some shards for that subscription. In some examples, the leader 305 may revoke such shards from another worker 324 first to load balance. When a shard is assigned, the worker 322 creates a range 342 for the shard. The range 342 and watcher perform the message handling for their assigned shard. The range 342 starts listening for notifications for the corresponding topic shard, the notifications indicating that the queue in the distributed database 370 has changed. The range 342 then scans the cursors and queue metadata to know exactly what how many messages are in the queues in the shard and what the consumer 352 has already processed. If it is behind for any queue, the range 342 will activate the next message. For every new message, the new message is appended by calling the writer 380, which will write the message to the database 370 and update the metadata. It then sends an opportunistic "fast path" notification to let all impacted ranges 342 know that a new message is available for delivery. When the range 342 sees the notification, it can activate it immediately, assuming the consumer 352 was not behind. The range 342 thus reads the message payload from the database 370 and sends it to the consumer 352. The consumer 352 receives the message and performs whatever action necessary—sometimes nothing. It then sends an ACK in response to the message to the range 342. The range 342 receives the ACK indicating that the message was processed correctly. It updates the cursor in the database 370 to durably record progress. Once done, it will activate the next message in the queue, if any.

Figure 4:
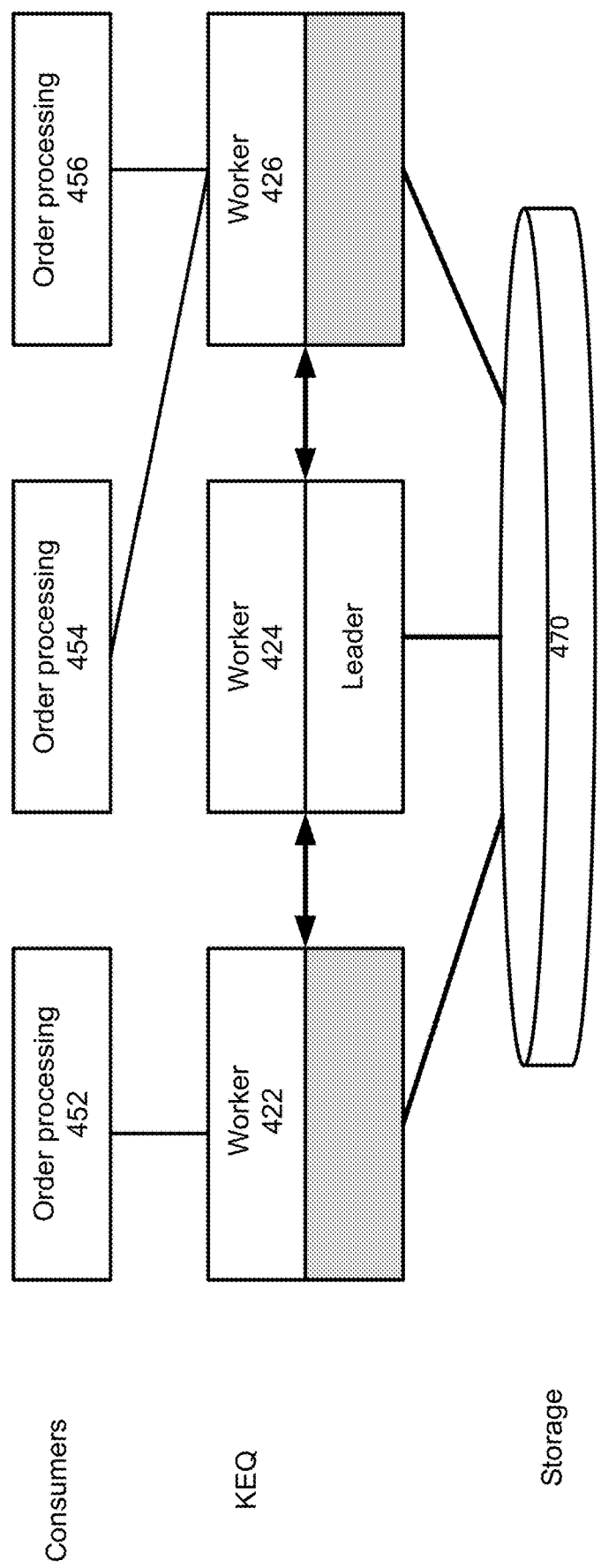
FIG. 4 is a block diagram illustrating another example architecture of KEQ according to aspects of the disclosure.

FIG. 4 provides another illustration of the KEQ architecture in relation to external components, such as consumers and storage. KEQ includes a plurality of worker nodes 422, 424, 426. In this example, the worker node 424 is elected leader, and therefore may be responsible for delegating "work," such as partitions or shards, to the available workers 422-426. The leader 424 may communicate with the workers via any communication protocol, such remote procedure calls (RPCs). The workers 422-426 watch for updates from the leader 424.

The workers 422-426 communicate with consumer clients, for example via bidirectional streaming, RPC, or other mechanisms, to serve data, such as a message payload added by a producer. For example, in an order placement context, the message payload may include order information as well as changes since a previous event.

The consumers may include order processing systems 452, 454, 456. The order processing systems 452-456 may be external or remote computing systems. The order processing systems 452-456 may include different types of processing systems, such as systems for confirming orders, systems for printing orders, etc.

The workers 422-426 also communicate with storage 470, which may include, for example, a distributed database and a distributed key-value store.

Both the number of consumers and the number of workers 422-426 can be scaled. For example, as more orders are received and therefore more event queues are created, additional workers 422-426 may be added. Further, consumers may be added or removed, such as when additional clients would like to participate in receiving and fulfilling orders. The scaling of the workers 422-426 may be independent of the scaling of the consumers, such that the one may scale without the other, scaling may be performed to a different extent for the works 422-426 as compared to the consumers, etc.

Figure 5:
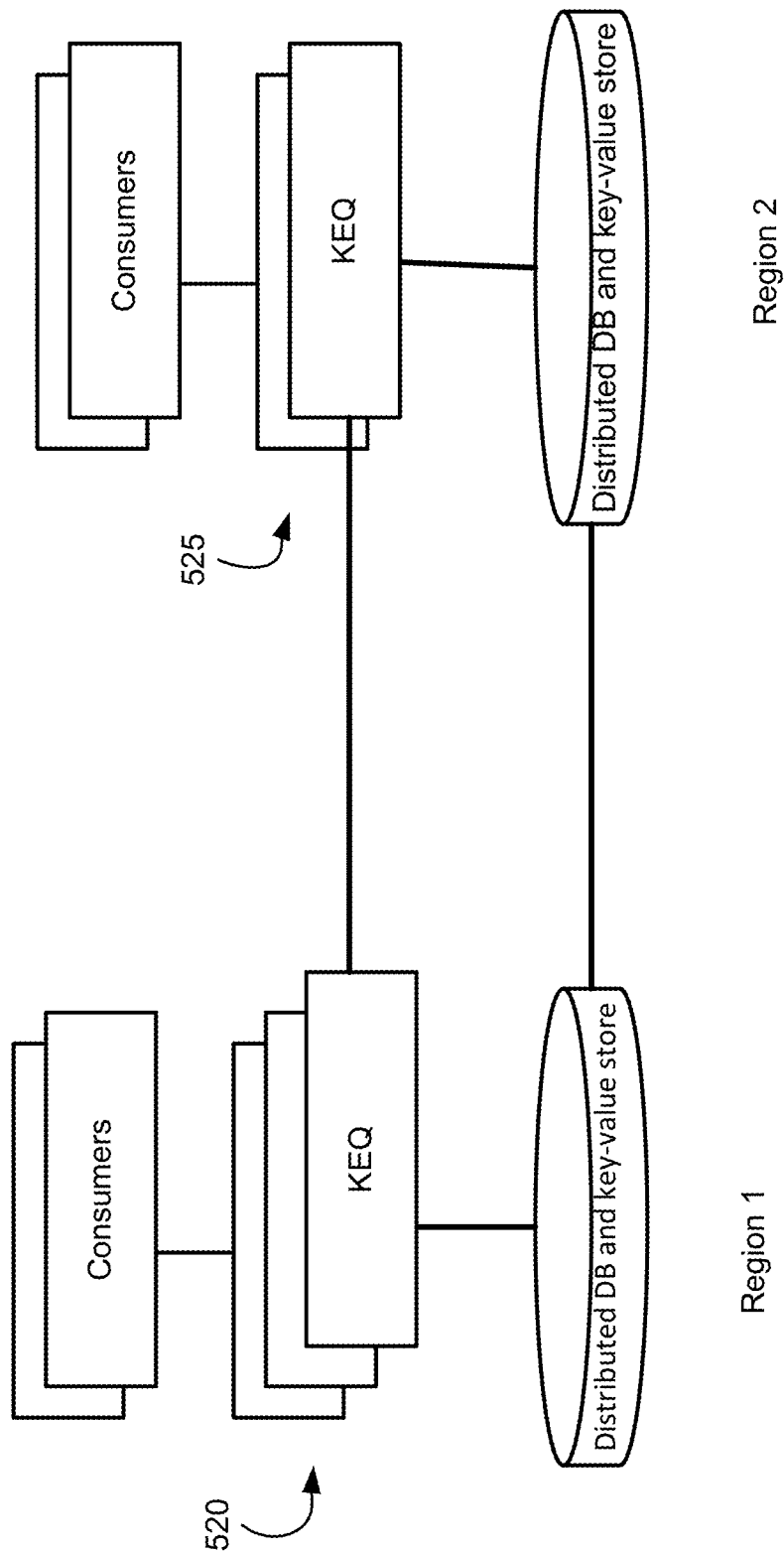
FIG. 5 is a block diagram illustrating an example multi-regional architecture of KEQ according to aspects of the disclosure.

FIG. 5 illustrates an example of the order processing stack of FIG. 4 active on multiple regions. For example, Region 1 includes a first plurality of consumers in communication with KEQ nodes 520, such as the workers and leaders discussed above, which are further in communication with a distributed database. Region 2 includes similar components, with consumers in communication with KEQ nodes 525. A number of each of these components in Region 1 may be the same or different than the number of each of these components in Region 2.

Region 2 may be geographically separated from Region 1. For example, the regions may be in different cities, countries, or continents. Consumers may communicate with the KEQ worker nodes that are geographically closest or within the same region. This may reduce latency in communication.

The KEQ nodes 520 in Region 1 may communicate with the KEQ nodes 525 in Region 2. For example, in some instances, all nodes may connect to a leader on one of the nodes.

Figure 6:
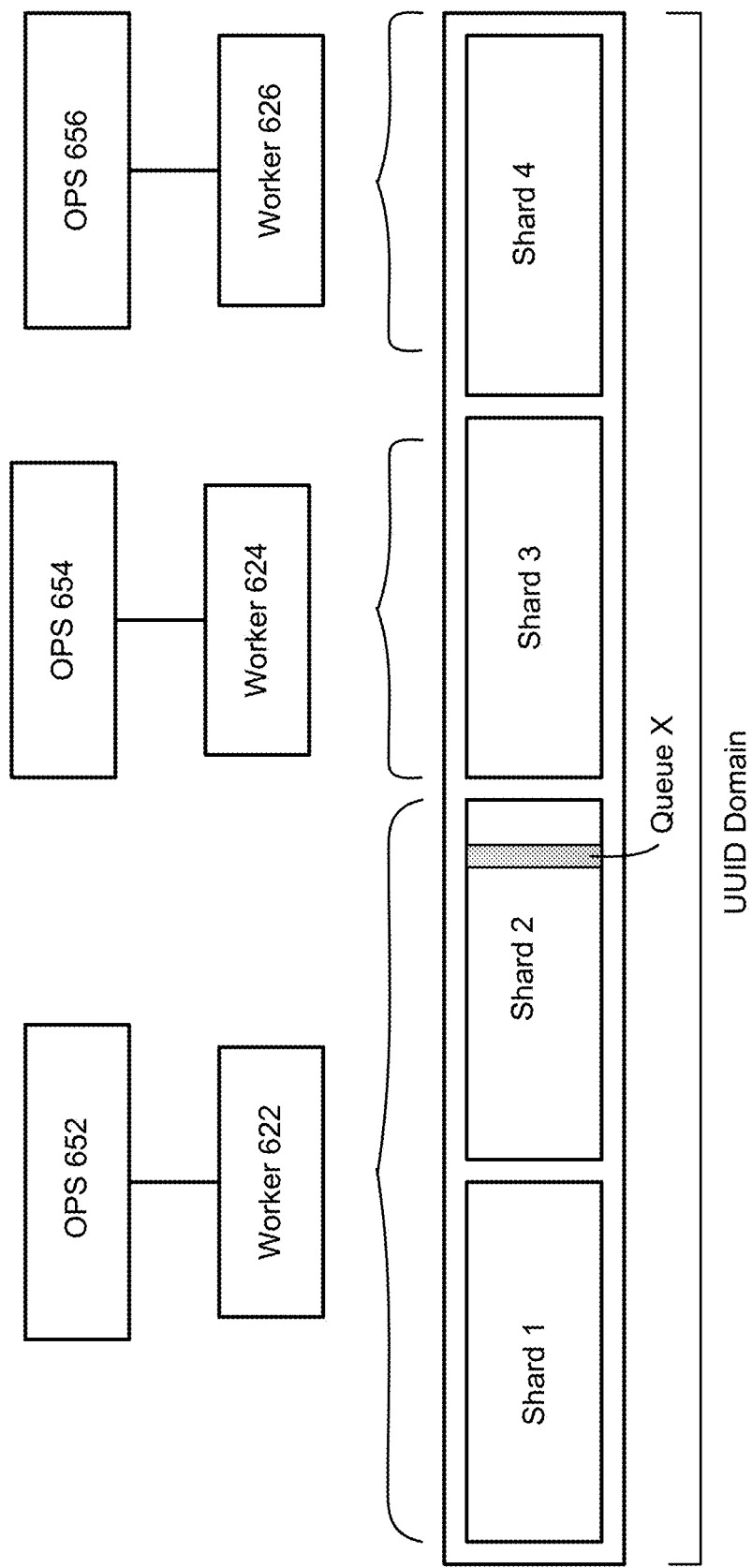
FIG. 6 is a block diagram illustrating example access to shards according to aspects of the disclosure.

FIG. 6 illustrates an example of sharding in KEQ. Key space may be divided into regional UUID ranges. Connected consumers may be granted exclusive access to a set of shards created in memory in a worker. Each shard may be, for example, a set of contiguous queue identifiers that references potential messages and cursors stored in the distributed database. A leader distributes work across workers 622, 624, 626. Consumers, such as order processing systems (OPS) 652, 654, 656, connect to the workers. For example, each OPS may connect to one worker, such that OPS 652 connects to worker 622, OPS 654 connects to worker 624, and OPS 656 connections to worker 626. The consumer gains exclusive access to one or more shards of the subscription. For example, OPS 652 and worker 622 have exclusive access to Shard 1 and Shard 2, while OPS 654 and worker 624 have exclusive access to Shard 3, and OPS 656 and worker 626 have exclusive access to Shard 4. In this example, Queue X falls within Shard 2, so worker 622 and only worker 622 gets the messages for Queue X, as long as worker 622 is healthy and connected. When the worker 622 disconnects, Shard 1 and Shard 2 are freed and may be granted to another worker. As additional shards are added, the number of workers may be scaled up to add more workers.

Figure 7:
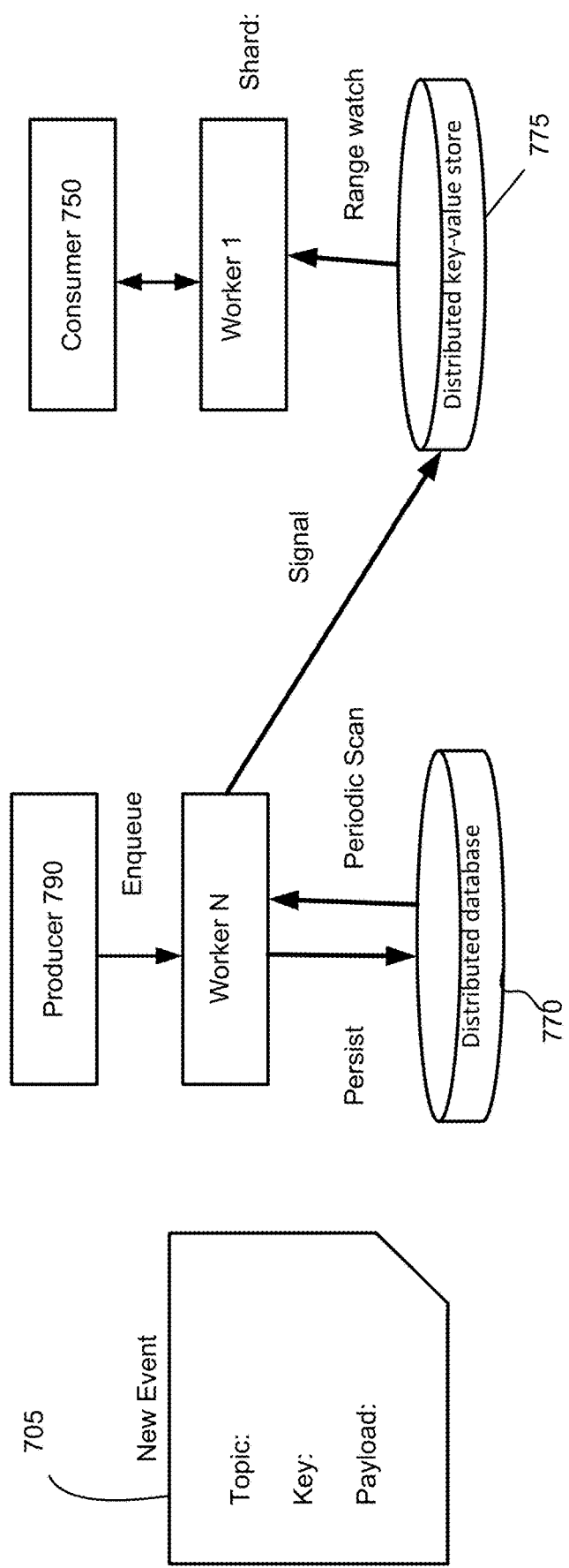
FIG. 7 is a block diagram illustrating an example enqueuing process according to aspects of the disclosure.

FIG. 7 illustrates an example of event delivery using KEQ. New events 705 are written to distributed database 770 and updates are distributed to an appropriate worker via key-value store 775. For example, a producer 790 generates a message or request including the new event 705 and provides the message or request to KEQ. While the message is illustrated as being received at worker N in FIG. 7, it may be received at a writer as discussed above in connection with FIG. 3. The new event 705 may include a topic, key, and a payload. The key may be, for example, a UUID key used to group events as a queue.

KEQ enqueues the message, such as by writing the new event 705 to the distributed database 770 and setting a key with an event identifier in the key-value store 775. When a message or request is enqueued, the worker N may send a "fast path" signal to the key-value store 775 for low latency. The fast path signal may be, for example, any broadcast notification. The notification may include a payload that identifies a queue and sequence number of the new message, such as orders/5000:42 for the 42nd message in that queue. The key-value store 775 streams key changes to consumers 750 that are "listening" on a shard in the distributed database 770 through a range watch. A periodic watch of the distributed database 770 ensures no events are missed by the fast path in case of failures.

Figure 8:
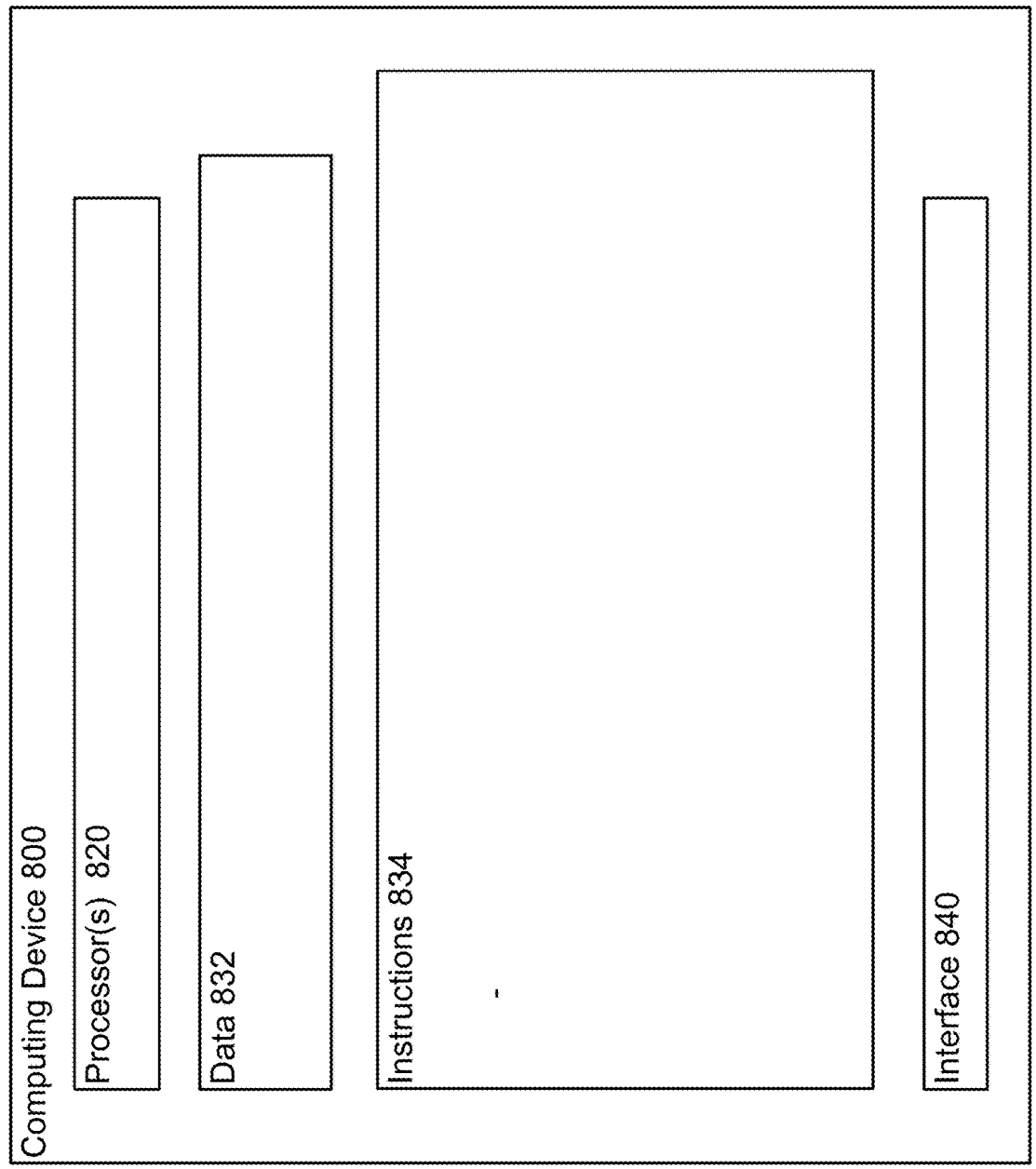
FIG. 8 is a block diagram illustrating an example computing device for KEQ according to aspects of the disclosure.

FIG. 8 illustrates an example computing device 800, which may be configured to perform KEQ processing as describe above. The computing device 800 includes one or more processors 820, memory 830 and other components typically present in computing devices. Memory 830 can store information accessible by the one or more processors 820, including instructions 834 that can be executed by the one or more processors 820.

Memory 830 can also include data 832 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 834 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 832 may be retrieved, stored or modified by the one or more processors 820 in accordance with the instructions 834. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 820 can be any conventional processors, such as a commercially available CPU. Alternatively, the processors can be dedicated components such as an application specific integrated circuit ("ASIC") or other hardware-based processor. Although not necessary, one or more of computing devices 800 may include specialized hardware components to perform specific computing processes.

The computing device 800 may include a communication interface 840 enabling communication between the device 800 and other components, such as a distributed database, key-value store, consumer systems, etc. The computing device may communicate over a network and with other devices using various protocols and systems, such that the network can be part of the Internet, World Wide Web, specific intranets, wide area networks, or local networks. The network can utilize standard communications protocols, such as Ethernet, WiFi, HTTP, protocols described in IEEE 802.88, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Although FIG. 8 functionally illustrates the processor, memory, and other elements as being within the same block, the processor, computer, computing device, or memory can actually comprise multiple processors, computers, computing devices, or memories that may or may not be stored within the same physical housing. Accordingly, references to a processor, computer, computing device, or memory will be understood to include references to a collection of processors, computers, computing devices, or memories that may or may not operate in parallel. Yet further, although some functions described below are indicated as taking place on a single computing device having a single processor, various aspects of the subject matter described herein can be implemented by a plurality of computing devices, for example, in the "cloud." Similarly, memory components at different locations may store different portions of instructions 834 and collectively form a medium for storing the instructions. Various operations described herein as being performed by a computing device may be performed by a virtual machine. By way of example, instructions 834 may be specific to a first type of server, but the relevant operations may be performed by a second type of server running a hypervisor that emulates the first type of server. The operations may also be performed by a container, e.g., a computing environment that does not rely on an operating system tied to specific types of hardware.

Example Methods

Further to the example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 9:
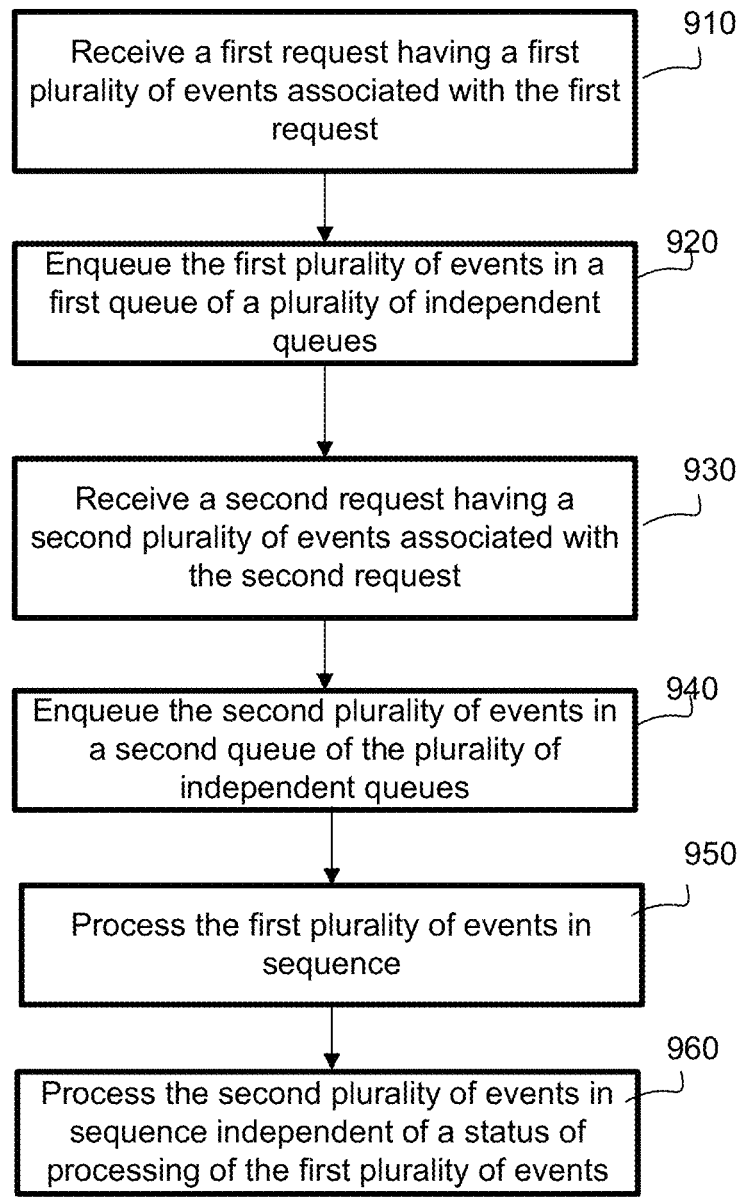
FIG. 9 is a flow diagram illustrating an example method according to aspects of the disclosure.

FIG. 9 is a flow diagram illustrating an example method 900 according to aspects of the disclosure. The method 900 may be performed by, for example, one or more computing devices in a KEQ system.

In block 910, a first request is received, the first request having a first plurality of events to take place to fulfill the first request. The first request may be, for example, a message requesting or ordering goods or services. By way of example only, the first request may be a request for delivery of a food order. In such an example, the events associated with the request that take place to fulfill the request may be events such as confirming order, printing order, beginning preparation of food, completing packaging of food, food ready for pickup, food picked up by delivery driver, food en route to destination, etc.

In block 920, the first plurality of events are enqueued in a first queue of a plurality of independent queues. For example, the events may be written into a queue in a distributed database. The queue may be identified using, for example, a unique key stored in an associated key-value store. According to some examples, the key-value store or one or more other devices may provide a notification to a worker node that the queue is ready for processing.

In block 930, a second request is received, the second request having a second plurality of events to take place to fulfill the second request. By way of example only, the second request may be a second food delivery order placed by a different customer. The second plurality of events may be similar or different than the first plurality of events.

In block 940, the second plurality of events are enqueued in a second queue of the plurality of independent queues, the second queue separate from the first queue. For example, the second plurality of events are also written to the distributed database, with an associated identifier in the key-value store.

In block 950, the first plurality of events are processed in sequence. For example, worker nodes in communication with consumers may determine when the consumer have completed tasks corresponding to the events. For example, the worker nodes may determine when the consumer have finished preparing food, etc. Accordingly, the worker nodes may update a pointer in the queue to indicate a processing status of the events.

In block 960, the second plurality of events are processed in sequence, wherein the processing of the second plurality of events is independent of a status of processing of the first plurality of events. For example, none of the first plurality of events must be completed before processing any of the second plurality of events. As such, if a failure occurs in one of the first plurality of events, the second plurality of events of the second queue may continue to be processed.

The example systems and methods described above are beneficial in that they provide for reliable, scalable processing of requests. For example, by writing and processing queues independently, multiple orders can be processed without head-of-line blocking.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of managing requests and coordinating fulfilment of the requests by one or more processors in communication with a distributed database and a key-value store, the method comprising:

receiving, at the one or more processors, a first request, the first request having a first plurality of events to take place to fulfill the first request;

writing, by the one or more processors, a first plurality of messages corresponding to the first plurality of events in a first queue of a plurality of independent queues in a distributed database, comprising:
    assigning, by a leader server, a first shard of the distributed database to a first worker server for the first request, wherein the first shard is exclusively accessed by the first worker server;
    creating, by the first worker server, a first identifier for the first queue in the first shard of the distributed database; and
    providing a first signal to a distributed key value store in communication with the distributed database, the first signal indicating the first identifier for the first queue;

receiving, at the one or more processors, a second request, the second request having a second plurality of events to take place to fulfill the second request;

writing, by the one or more processors, a second plurality of messages corresponding to the second plurality of events in a second queue of the plurality of independent queues in the distributed database, the second queue separate from the first queue, the writing comprising:
    assigning, by the leader server, a second shard of the distributed database to a second worker server for the second request wherein the second shard is exclusively accessed by the second worker server;
    creating, by the second worker server, a second identifier for the second queue in the second shard of the distributed database; and
    providing a second signal to the distributed key value store in communication with the distributed database, the second signal indicating the second identifier for the second queue; and processing, by the one or more processors, the first plurality of events in the first queue in sequence and the enqueued second plurality of events in the second queue in sequence independent of a status of processing of the first plurality of events, wherein the processing for each queue comprises:

receiving, at a respective worker server, a notification that a message is available in a respective queue;

reading, by the respective worker server, a message payload from the distributed database;

sending, by the respective worker server, the message payload to a consumer for performing an action based on the message payload;

receiving, by the respective worker server, an acknowledgement from the consumer that the message was processed by the consumer;

updating a cursor in the distributed database, the cursor recording progress of processing the message; and activating, by the respective worker server, a next payload in the respective queue.

2. The method of claim 1, further comprising
updating the respective queue based on the acknowledgement from the consumer by dequeuing the message from the respective queue.

3. The method of claim 2, wherein sending the message payload to the one or more consumers comprises at least one of bidirectional streaming or sending remote procedure calls to the one or more consumers.

4. The method of claim 2, wherein the consumer comprises a remote processing device at an external entity.

5. The method of claim 1, further comprising periodically scanning, by the one or more processors, for updates to the distributed database.

6. The method of claim 1, further comprising electing, by the one or more processors, the leader server for allocating the processing of the first plurality of events and the processing of the second plurality of events to selected processing units of the one or more processors.

7. The method of claim 1, wherein updating the cursor for the respective queue is based on a notification from the distributed key value store.

8. The method of claim 1, further comprising sending, by a writer component, a fast path notification each time a new message is written to the database, the fast path notification being received by the respective worker for responsively activating the message.

9. The method of claim 1, wherein the first worker server is distinct from the second worker server.

10. A system for managing requests and coordinating fulfilment of the requests, the system comprising:
one or more memories;
one or more processors in communication with the one or more memories, a distributed database, and a distributed key-value store, the one or more processors configured to:
receive a first request, the first request having a first plurality of events to take place to fulfill the first request;
write a first plurality of messaging corresponding to the first plurality of events in a first queue of a plurality of independent queues in a distributed database, wherein the one or more processors are configured to:
assign, by a leader server, a first shard of the distributed database to a first worker server for the first request, wherein the first shard is exclusively accessed by the first worker server;
create, by the first worker server, a first identifier for the first queue in the first shard of the distributed database; and
provide a first signal to a distributed key value store in communication with the distributed database, the first signal indicating the first identifier for the first queue;
receive a second request, the second request having a second plurality of events to take place to fulfill the second request;
write a second plurality of messages corresponding to the second plurality of events in a second queue of the plurality of independent queues in the distributed database, the second queue separate from the first queue, wherein the one or more processors are configured to:
assign a second shard of the distributed database to a second worker server for the second request wherein the second shard is exclusively accessed by the second worker server;
create a second identifier for the second queue in the second shard of the distributed database; and
provide a second signal to the distributed key value store in communication with the distributed database, the second signal indicating the second identifier for the second queue; and
process the enqueued first plurality of events in the first queue in sequence and the enqueued second plurality of events in the second queue in sequence, independent of a status of processing of the enqueued first plurality of events, wherein the processing comprises determining, by the range, a status of messages corresponding to the first and second queues, and activating messages for the respective queues based on the status of messages in the same queue.

11. The system of claim 10, further comprising an interface for communication with one or more consumers, wherein in processing the first plurality of events and processing the second plurality of events, the one or more processors are further configured to:
communicate event information through the interface to the-one or more consumers;
determine a status of completion of events by the one or more consumers; and
update the first queue and the second queue based on the determined status of completion by dequeuing the events based on the determined the status of completion from the respective queue.

12. The system of claim 11, wherein in communicating event information to the one or more consumers the one or more processors are configured for bidirectional streaming with the one or more consumers.

13. The system of claim 11, wherein the one or more consumers are remote processing devices at external entities.

14. The system of claim 10, wherein the one or more processors are further configured to periodically scan for updates to the distributed database.

15. The system of claim 10, wherein the one or more processors are further configured to elect the leader server for allocating the processing of the first plurality of events and the processing of the second plurality of events.

16. The system of claim 10, wherein in processing the one or more processors are configured to:
receive a notification that a message is available in a respective queue;
read a message payload from the distributed database;
send the message payload to a consumer for performing an action based on the message payload;
receive an acknowledgement from the consumer that the message was processed by the consumer;
update a cursor in the distributed database, the cursor recording progress of processing the message; and
activate a next payload in the respective queue.

17. A non-transitory computer-readable medium storing instructions executable by one or more processors for performing a method of managing requests and coordinating fulfilment of the requests, comprising:
receiving a first request, the first request having a first plurality of events to take place to fulfill the first request;
writing a first plurality of messages corresponding to the first plurality of events in a first queue of a plurality of independent queues in a distributed database, comprising:
assigning, by a leader server, a first shard of the distributed database to a first worker server for the first request, wherein the first shard is exclusively accessed by the first worker server;
creating, by the first worker server, a first identifier for the first queue in the first shard of the distributed database; and
providing a first signal to a distributed key value store in communication with the distributed database, the first signal indicating the first identifier for the first queue;
receiving a second request, the second request having a second plurality of events to take place to fulfill the second request;

writing a second plurality of messages corresponding to the second plurality of events in a second queue of the plurality of independent queues in the distributed database, the second queue separate from the first queue, the writing comprising:
  assigning, by the leader server, a second shard of the distributed database to a second worker server for the second request wherein the second shard is exclusively accessed by the second worker server;
  creating, by the second worker server, a second identifier for the second queue in the second shard of the distributed database; and
  providing a second signal to the distributed key value store in communication with the distributed database, the second signal indicating the second identifier for the second queue;
processing the first plurality of events in the first queue in sequence; and
processing the second plurality of events in the second queue in sequence, independent of a status of processing of the enqueued first plurality of events,
wherein the processing for each queue comprises determining a status of messages corresponding to the respective queues, and activating messages for the respective queues based on the status of messages in the same queue.

18. The non-transitory computer-readable medium of claim 17, wherein the processing comprises:
  receiving, at a respective worker server, a notification that a message is available in a respective queue;
  reading, by the respective worker server, a message payload from the distributed database;
  sending, by the respective worker server, the message payload to a consumer for performing an action based on the message payload;
  receiving, by the respective worker server, an acknowledgement from the consumer that the message was processed by the consumer;
  updating a cursor in the distributed database, the cursor recording progress of processing the message; and
  activating, by the respective worker server, a next payload in the respective queue.

* * * * *